(12) United States Patent
Yokoyama

(10) Patent No.: US 6,278,941 B1
(45) Date of Patent: Aug. 21, 2001

(54) ROUTE GUIDE SYSTEM

(75) Inventor: Shoji Yokoyama, Tokyo-to (JP)

(73) Assignee: Kabushikikaisha Equos Research (JP)

( * ) Notice: Subject to any disclaimer, the term of this patent is extended or adjusted under 35 U.S.C. 154(b) by 0 days.

(21) Appl. No.: 09/720,430

(22) PCT Filed: Apr. 28, 2000

(86) PCT No.: PCT/JP00/02821
§ 371 Date: Feb. 28, 2001
§ 102(e) Date: Feb. 28, 2001

(87) PCT Pub. No.: WO00/66975
PCT Pub. Date: Nov. 9, 2000

(30) Foreign Application Priority Data

Apr. 28, 1999 (JP) .................................................. 11-123111

(51) Int. Cl.[7] .................................................. G06F 165/00
(52) U.S. Cl. .............................. 701/209; 701/213; 701/24; 701/25
(58) Field of Search ................................. 701/24, 209, 25, 701/26, 208, 213, 214; 340/990, 995

(56) References Cited

U.S. PATENT DOCUMENTS

| | | | |
|---|---|---|---|
| 5,850,618 | * | 12/1998 | Saetsuyu et al. .................... 701/209 |
| 5,864,305 | * | 1/1999 | Rosenquist ............................ 701/208 |
| 5,895,436 | * | 4/1999 | Savoie et al. ......................... 701/209 |
| 6,175,803 | * | 1/2001 | Chowanic et al. ................... 701/209 |
| 6,178,378 | * | 1/2001 | Leibold ................................ 701/209 |

FOREIGN PATENT DOCUMENTS

67672 * 12/1982 (EP) ...................................... 701/209

* cited by examiner

Primary Examiner—Richard M. Camby
(74) Attorney, Agent, or Firm—Lorusso & Loud

(57) ABSTRACT

In order to enable a location function for telling the present position on a screen as a function usually used when traveling in a known area to be always used by its lone, a navigation apparatus 100 mounted on a car stores display map data in it, and displays a map of an area around a present position and the present position together on a display portion 106. It is attained to reduce the amount of stored data and the burden of processing on the navigation apparatus 100 by receiving a traveling route to a destination from a center apparatus 150 in case that a traveling route guidance to the destination is needed. Data of the whole traveling route to a destination are not transmitted at one time but data of only a traveling route from the present position to a specific distance ahead are transmitted at one time and thereby it is possible to reduce the amount of data of communication and start the car earlier. And by newly finding a traveling route to the destination before each transmission of a divided route, it is possible to transmit the optimum traveling route in consideration of the latest traffic information.

10 Claims, 9 Drawing Sheets

(a)

(b)

ROUTE GUIDE SYSTEM

BACKGROUND OF THE INVENTION

1. Technical Field of the Invention

The present invention relates to a route guidance system, and more particularly to a route guidance system composed of a navigation apparatus mounted on a car and a center apparatus to communicate with a plurality of navigation apparatuses.

2. Related Art (Background Art)

A navigation apparatus to guide a driver on a traveling route to its destination is widely spread. Such a navigation apparatus is provided with data related to a destination which may be an object of guidance, road data for searching and finding a traveling route to a destination and map data for drawing a map, and searches and finds a route from the present place to the destination using road information and performs guidance in the direction to travel (to go straight or to change the direction of progress) according to the present position and the found route while detecting the present position of the car by means of a GPS receiver and the like.

In order to make it possible to set a destination in various manners based on a telephone number, the name of a facility, a genre, an address and the like, such a navigation apparatus needs to be provided with detailed destination data related to destinations as well as road data of various information such as the number of lanes, a road width, one-way street, no right-turn, no entry and the like for each intersection and road, and therefore, is made to store enormous data in it.

On the other hand, recently, a communication navigation system in which a navigation apparatus at the car side is provided with minimum data and takes charge of detection of the present place and a traveling route guidance, and a process of finding a route to a destination is performed collectively by a given information center has been developed. In such a system, a driver receives a traveling route found to its destination, map data and the like from an information center by means of a radio communication means such as a car telephone, a mobile telephone, a PHS (personal handyphone system) or the like connected to a navigation apparatus.

According to such a communication navigation system, it is not necessary for a navigation apparatus to keep map data, destination data and road data for route finding, and such a process requiring a great amount of computation as a route finding process becomes unnecessary, and thus it becomes possible to perform more rapidly other processes thanks to reduction of the burden on a controller.

The inventors of the present application have known that functions required by a user such as a driver or the like are different according to the purpose or state of traveling.

That is to say, in case of traveling by car, a user most frequently travels around its home or company, or travels repeatedly in the same certain local area. In such a case, it is possible for the user to reach properly its destination even if the user does not take the trouble of receiving a route guidance by voice according to its traveling route found by setting its destination and finding the route. For example, in case of knowing the location of its destination such as a department store, an amusement park, a golf course, a branch office, a customer's office and the like, a route guidance is naturally unnecessary, and if its destination is near around a road along which the user has traveled, it is enough for the user to make it possible to confirm the present position of its car on a screen after it has traveled near around its destination.

And a case that the user needs to be guided on the route to its destination is limited to a case that the user is a sheer stranger about its destination and peripheral area, a case that the route to its destination is complicated, and the like, and in such a case a route guidance to the destination is an indispensable function, but the number of such travels is relatively less in comparison with the total number of travels (total number of actions of taking a car).

In such a way, functions required when a driver travels by car are different according to the state of traveling or its destination, but since up to now a navigation apparatus and a communication navigation system are composed regardless of such a purpose or condition of traveling of a driver, a conventional navigation apparatus has unnecessary functions and many portions being poor in efficiency of use.

That is, in case of assuming the maximum possible functions and processes for navigation and implementing these functions on a navigation apparatus at the car side, since destinations to be set or roads to be searched and found are intended for a wide specific area, for example, the whole country (whole Japan, whole United State of America, whole Germany, etc.), destination data and road data become enormous and a destination setting process or a route finding process is performed on the basis of an enormous amount of data and therefore there is a problem that a great amount of computation and a long time of computation are needed and the burden on a controller to perform these processes are heavy. And since road data vary always due to completion of a new road, or new setting or changing of "no right-turn", "no left-turn" or the like, each navigation apparatus needs to update such road data.

On the other hand, in case of a communication navigation system, there is an advantage that such a burden on a controller as a data storage or a high-degree process is lightened, but there is a problem that communication with an information center needs to be frequently performed communication expenses become large and a time of reception becomes longer due to the increase of the amount of data to be received from an information center because of reduction of data kept in a car.

Thereupon, the present invention has been performed in order to solve such existing problems, and aims at providing a route guidance systen more suitable for the purpose or state of traveling of a user in which data to be stored and functions to be performed are properly shared between a navigation apparatus mounted on a car and a center apparatus.

SUMMARY OF THE INVENTION

Disclosure of the Invention

The present invention provides a route guidance system composed of a navigation apparatus mounted on a car and a center apparatus communicating with a plurality of navigation apparatuses, wherein;

said navigation apparatus comprising;
- a storage means for having background map data stored in it,
- a present position detecting means for detecting the present position of the car,
- a display device,
- a location means for reading and displaying a background map around the present position detected by said present position detecting means on said display device, and displaying said present position on the background map,
- a car side communication means for transmitting said detected present position and request information necessary for setting a destination in said center apparatus, and receiving a traveling route found to the destination from the center apparatus, and a route guidance means for guiding a user on the traveling route received by this communication means;

said center apparatus comprising;

a background map database, a destination database storing in it detailed information related to destinations for setting a destination, a traveling road database for finding a route to a destination, a destination setting means for setting a destination meeting request information transmitted from said navigation apparatus by means of said destination database, a route finding means for searching and finding a traveling route from the present position of the car transmitted from said navigation apparatus to the destination set by said destination setting means by means of said traveling road database, and a center side communication means for receiving said request information and said present position through communication with said navigation apparatus, and transmitting the traveling route found by said route finding means.

And the present invention provides a route guidance system composed of a navigation apparatus mounted on a car and a center apparatus communicating with a plurality of navigation apparatuses, said center apparatus dividing and transmitting a traveling route found to a destination to said navigation apparatus, wherein;

said navigation apparatus comprising;

a background map data storage means for having background map data stored in it, a present position detecting means for detecting the present position of the car, a display device, a location means for reading a background map around the present position detected by said present position detecting means from said background map data storage means and displaying the background map on said display device, and displaying said present position on the background map, a car side communication means for transmitting request information necessary for setting a destination in the center apparatus, and receiving a traveling route from the center apparatus, and a route guidance means for guiding a user on the traveling route received by this communication means;

said center apparatus comprising;

a destination database storing in it detailed information related to destinations for setting a destination, a traveling road database for finding a route to a destination, an updating means for updating said traveling road, a destination setting means for setting a destination meeting request information transmitted from said navigation apparatus by means of said destination database, a route finding means for searching and finding a traveling route to the destination set by said destination setting means by means of said traveling road database before each transmission of a divided traveling route to said navigation apparatus, a route dividing means for generating a traveling route to be transmitted by dividing a traveling route found by said route finding means, and a center side communication means for receiving said request information and transmitting the traveling route generated by said dividing means through communication with said navigation apparatus.

And in the present invention, said navigation apparatus transmits a request for transmission of a divided route to said center apparatus said route finding means of said center apparatus finds a traveling route to a destination each time it receives a request for transmission of a divided route or in case that the cause of a traveling failure such as a traffic accident occurs on a traveling route lastly transmitted.

And in the present invention, said center side communication means is provided with a background map database storing in it background map data about a wide specific area, reading background map data required from said navigation apparatus from said background map database, and transmitting the background map data to said navigation apparatus which has performed the request for transmission, said navigation means stores background map data of a given area smaller than said specific area into a background map data storage means, and comprises a request means for requesting said center apparatus to transmit background map data of an area other than the given area stored in said background map data storage means through said car side communication means, and a second storage means for temporarily storing in it the background map data requested by this request means.

And in the present invention, said navigation apparatus is provided with basic destination setting data consisting of typical destinations and a simple destination setting means for simply setting a destination according to these basic destination setting data, and said location means displays the destination set by said simple destination setting means together with a background map and the present position displayed on said display device.

DETAILED DESCRIPTION OF THE PREFERRED EMBODIMENTS

Figure 1:
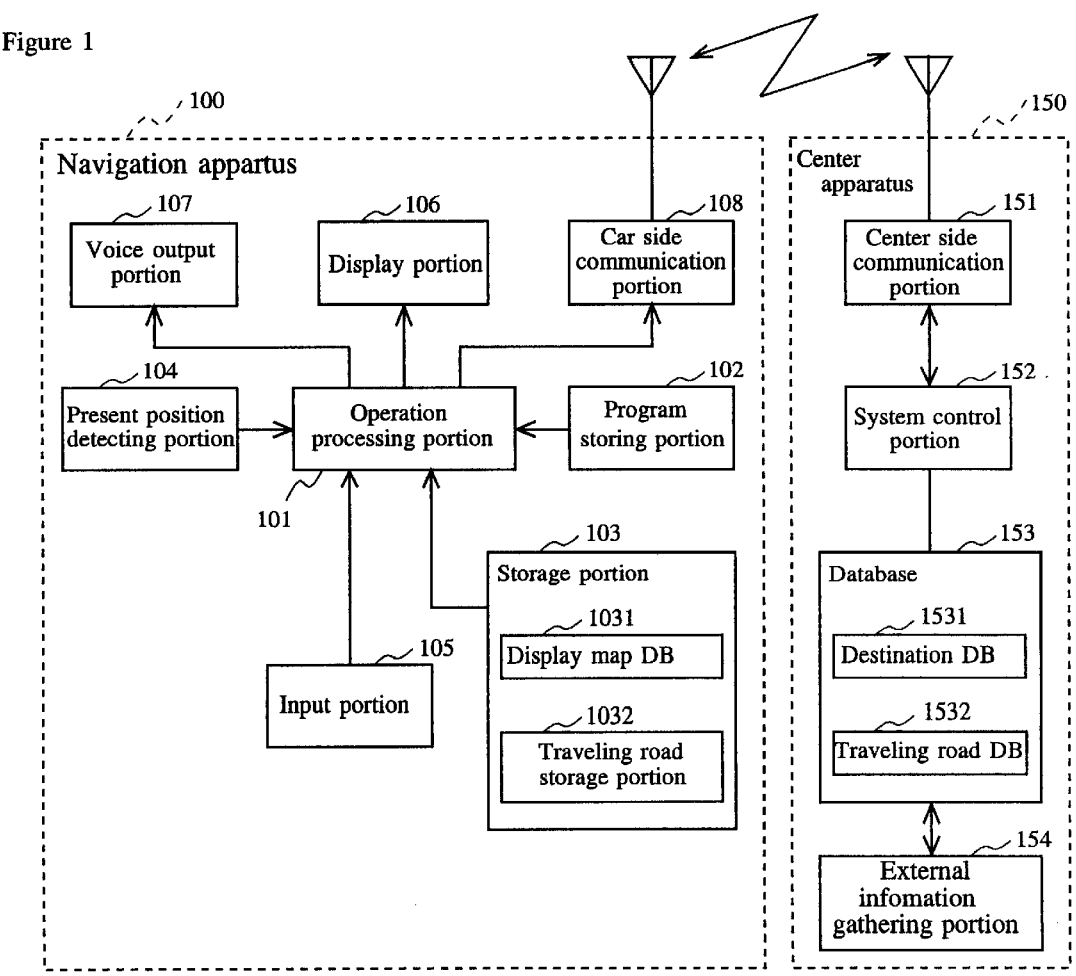
FIG. 1 is a composition diagram of a route guidance system of an embodiment of the present invention.

Best Mode for Carrying out the Invention

Preferred embodiments of the present invention are described in detail with reference to FIGS. 1 to 11 in the following.

(1) Outline of a first embodiment

This embodiment distinguishes between functions needed in case of traveling in a known area ordinarily being most frequently used and functions needed in case of traveling in an unknown area being low in frequency of use. Hereupon, a known area is an area in which a user is conceived to know the name of a place or the existence of a representative building, and does not need the user to know detailed streets and its traveling route.

And a navigation apparatus mounted on a car makes it possible to always use a location function alone for knowing the present position on a screen as a function usually used when traveling in a known area. For this purpose, this apparatus keeps display map data (for being displayed on a screen) within a given range of about 200 km stored in a storage such as a hard disk, flash memory or the like, and displays a map around the present position together with the present position of the car on a display device. Thanks to this, a user can know where it is traveling around at present, and this is enough in case of usually traveling in a known area.

In such a way, it is sufficiently possible for a user to travel to a destination by using a location function in a known area and confirming the present position of a car together with known information of a place name, a facility and the like on a map even if it does not know its traveling route and does not receive a traveling route guidance.

A navigation apparatus is provided with no database for setting a destination nor traveling road database for route finding, nor functions for performing a destination setting process and a route finding process. Therefore, in case of needing a traveling guidance in a known area or in case of needing a traveling route guidance to a destination like a case of traveling in an unknown area, the navigation apparatus attains reduction of data to be stored and reduction of a processing burden by receiving a traveling route to the destination from a center apparatus instead of performing a destination setting process and a route finding process. And the navigation apparatus performs a voice guidance on the received traveling route and a traveling route guidance by displaying an intersection map.

On the other hand, a center apparatus keeps a detailed destination database and a traveling road database which have a great amount of data and performs a destination setting process and a traveling route finding process for reaching a destination through communication by using these databases, and thereby reduces the burden on a navigation apparatus Transmission (at the center apparatus side) and reception (at the navigation apparatus side) of a traveling route are performed at one time not for the total traveling route but for a partial traveling route of only a specific distance from the present position (or the end of a route already transmitted), and thereby it is possible to make a communication time shorter (an amount of communication data smaller) and start a car earlier at the car side.

And when the car reaches a specific distance (200 m for example) on this side of the end of the traveling route already received, the navigation apparatus transmits again a request for its traveling route, or the center apparatus detects automatically the position of the car and the information center finds again a traveling route from the present position of the car to its destination and transmits a traveling route of a specific distance following the already transmitted traveling route to the navigation apparatus. In such a way, by newly finding a traveling route to a destination and transmitting a traveling route of a specific distance each time the center apparatus receives a request, it is possible to transmit the optimum traveling route in consideration of the latest traffic information (traffic accident information or traffic congestion information) at the point of time of receiving a request.

(2) Details of the first embodiment

FIG. 1 shows the composition of a route guidance system.

This route guidance system is composed of a navigation apparatus 100 mounted on a car and a center apparatus 150 communicating with a plurality of navigation apparatuses 100.

The navigation apparatus 100 is provided with an operation processing portion 101, a program storing portion 102, a storage portion 103, a present position detecting portion 104, an input portion 105, a destination display portion 106, a voice output portion 107 and a car side communication portion 108.

The center apparatus 150 is provided with a center side communication portion 151, a system control portion 152, a database 153 and an external information gathering portion 154.

Figure 10:
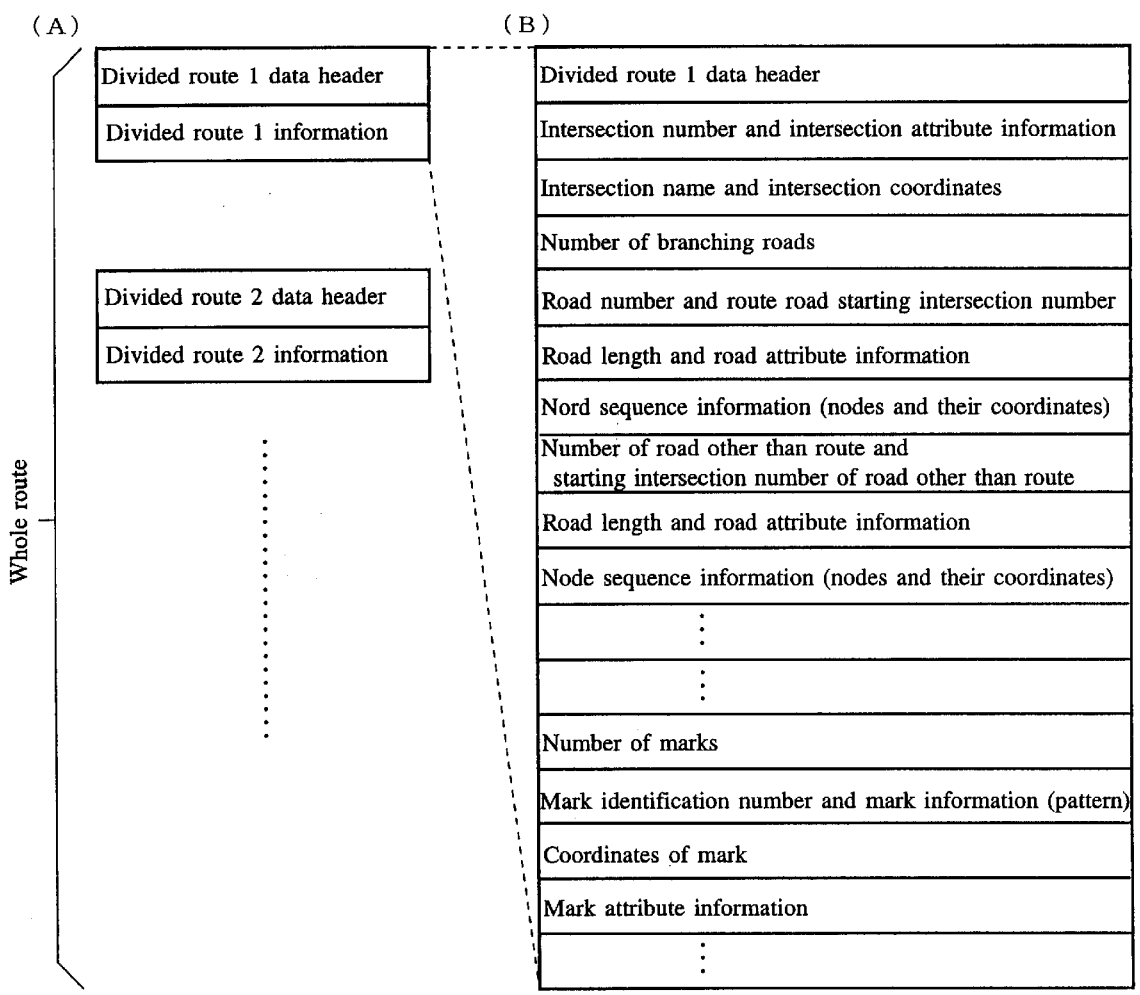
FIG. 10 is an explanatory diagram conceptually showing found route data in an information center.

The operation processing portion 101 in the navigation apparatus 100 is provided with a CPU and performs a location process capable of being used (functioning) at the car side alone, a communication process for communicating with the center apparatus 150 with respect to a route finding process, and a route guidance process for guiding a user on a traveling route to its destination received by this communication process from the center apparatus 150. In case of receiving a traveling route to a destination, this embodiment does not receive the whole traveling route to the destination at one time, but receives a traveling route of a specific distance (divided route) at one time and performs a guidance process, and performs a communication process for transmitting a request for the next traveling route near the end of the divided route already received to the center apparatus 150. Both of these processes are described later as a request and route guidance process (FIG. 10).

The program storing portion 102 stores in it programs for performing various processes by means of the operation processing portion 101 and uses various storage media such as a ROM and the like.

The storage portion 103 uses various storage media such as a RAM, CD-ROM, flash memory, DVD, hard disk and the like. This storage portion 103 is provided with a display map database (DB) 1031 and a traveling route storage portion 1032. This storage portion 103 does not have a traveling road database stored in it. This road DB is composed of such traveling road data required for finding a route to a destination as road data, intersection data, lane data, one-way street data, road-repairing data, traffic congestion information (place and congestion time zone) and the like, and is stored in the center apparatus 150, as described later. In such a way, by making the navigation apparatus have no traveling road database, it is possible to make small a necessary capacity of the storage portion 103. And the navigation apparatus lightens the burden on the operation processing portion 101 by having no traveling road DB nor program for performing a route finding process of searching and finding a route to a destination.

The display map DB 1031, which is secured in a hard disk, has display map data (background map data) for the whole area of a wide specific area (for example, the whole of Japan, the whole of Germany, the whole of United States of America and the like) stored in it. The display map DB 1031 functions as a background map data storage means.

Display map data can be stored as a map containing streets in a bit-map form as well as map data compressed by a specific mode such as JPEG and the like. And display map data may be composed of background color data (which are data representing the background color of a map, for example, data representing brown), vector data for representing a road or node data for drawing a street on a background, and data representing the width of a road. In case of drawing a street by means of vector data or node data, to use these data makes it easy to perform a map matching process of the present position.

And the traveling road storage portion 1032 is secured by a RAM, and has road data stored in it, said road data relating to a traveling road to a destination found and transmitted by the center apparatus 150.

This RAM is also used as a so-called working area where data necessary for communication with the center apparatus 150 are read and written.

And the storage portion 103 has also a present position storing area for storing the present position (East Longitude and North Latitude) measured by the present position detecting portion 104 at intervals of a specific time. The present position storing area has a plurality of positions stored in it and represents a traveling locus. In the present position storing area, a fixed distance or a fixed number of positions are stored, and when the present position of the car is newly measured, the earliest measured position is erased and the newly measured present position of the car is stored. Positions (plural East Longitudes and No rth Latitudes for representing a traveling locus) stored in the present position storing area are utilized in a so-called map matching process for identifying the present position of the car on the traveling route.

The present position detecting portion 104 is provided with a GPS receiver for receiving signals from a plurality of GPS satellites and measuring the absolute position of the car, a speed sensor for measuring a relative position of the car, an azimuth sensor and the like. A relative position measured by the speed sensor and the azimuth sensor is used in order to obtain a position in a tunnel or the like where the GPS receiver cannot receive a radio wave from a satellite, or in order to compensate for a measuring error of an absolute position measured by the GPS receiver.

As the input portion 105, various input devices such as a touch panel attached to the display surface of the display device 106, a joy stick, an information input device utilizing a voice recognition device and the like are used. In a touch panel, a user inputs some corresponding information or command by touching an icon or the like displayed on the display device 106 by finger.

And an information input device utilizing a voice recognition device recognizes a voice uttered by a user and inputs information or a command corresponding to the recognized voice.

The display device 106 uses various displays such as a liquid crystal display, CRT and the like, and displays a background map for location or an intersection map in a route guidance, and further displays various screens for setting a destination in a destination setting process by communication with the center apparatus as well as various images such as a key image and the like for input corresponding to a touch panel.

The voice output portion 107 is provided with a voice synthesizer and speaker, and synthesizes and outputs from the speaker a guidance speech for a route guidance to a destination such as "Turn to the right at the intersection 100 m ahead.", for example. Such a speaker for outputting a guidance speech may be used also as a speaker for a car audio or may be disposed above the driver's seat or at the center top of the win dshield or the like as a dedicated speaker.

The car side communication portion 108 is composed of a modem or the like and a radio communication device such as a mobile telephone, a PHS or the like connected to this modem or the like, and performs communication by voice and data with the center apparatus 150.

The communication between the car side communication portion 108 and the center side communication portion 151 is performed by a packet communication method in this embodiment, but may be performed by a circuit switching method according to a route guidance system.

The navigation apparatus 100 is composed as described above, and is formed into a 1DIN one-body size except a communication device connected to the car side communication portion 108, and the present position detecting portion 104 and the speaker of the voice output portion 107, and is positioned near the audio operation part.

On the other hand, the center side communication portion 151 of the center apparatus 150 is composed of communication devices such as a modem, terminal adapter and the like, and connects a communication circuit with the navigation apparatus 100 (a communication circuit by a radio communication means such as a PHS, a mobile telephone and the like).

The system control portion 152 is composed of a computer system provided with a CPU, ROM, RAM, other devices and the like not illustrated.

The CPU controls the whole system according to various programs stored in a storage means including a ROM, and performs various processes necessary in the center apparatus such as a destination setting process by communication, a route finding process from the present position to a destination and the like in this embodiment. And the system control portion 152 also performs a route finding and guidance data transmission process for dividing a traveling route found to a car destination into specific units and transmitting the divided routes to the navigation apparatus 100, and a segmenting process and a guidance data extracting process in said route finding and guidance data transmission process.

The ROM has programs and data stored in it for performing these various processes by the CPU.

The RAM is used as a so-called working area where various data are read and written when the CPU executes various programs.

As the database 153, a mass storage medium such as a hard disk, magneto-optic disk and the like to have various data stored in it is used, and a hard disk is used in this embodiment. This database 153 has a destination DB (database) 1531, a traveling road DB 1532 and other various data stored in it.

In the destination DB 1531, genre data having all destinations classified into individual genres, zone data obtained by classifying the destinations into individual zones, telephone directories, address books and the like are stored as data associated with various destinations necessary for setting a destination. And explanatory information about a destination, for example, explanatory information such as the existence, effects and the like of a spa when the destination is an inn, the size of a parking lot, the targeted ages (suitable for 3 or more years, school children, adults or the like), an admission fee, date of closure and the like when the destination is an a amusement park, explanatory information such as a religious sect, origin and the like in case of a temple, and explanatory information such as a playing fee and the like in case of a golf course are stored correspondingly to each destination. In such a way, by abundantly gathering and storing explanatory information, it is possible to find and set a destination meeting such a condition as "a place where children being 5 or less years old can play in nature in Kamakura" requested by a user of the navigation apparatus 100. In case of such a destination setting process, a proper destination may be set by obtaining a request for a destination by voice communication and making an operator assist the user.

And the destination DB 1531 may store in it Web information for setting a destination (screen for setting a destination) for enabling a mobile information terminal or a navigation apparatus having no program for setting a destination nor data for setting a destination to set the destination through the Internet by means of a browser of WWW (World Wide Web).

The traveling road DB 1532 stores in it various data such as road data, intersection data, lane data, node data, one-way street data, road-repairing data, traffic congestion information (place and congestion time zone) and the like.

Areas covered by data stored in the destination DB 1531 and the traveling road DB 1532 are wide specific areas. The specific areas include the whole of Japan, the whole of Germany, the whole of United States of America, the whole of a specific country, and the whole of a specific state or district. For example, in case of destination data, all facilities and the like capable of being set as a destination existing in Japan are stored in the destination DB1531 as destination data, and in case of road data, data for all roads in Japan (narrow streets having a width not more than a specific width are not included but it is possible to include narrow streets in a specific area or the whole of Japan) are stored in the traveling road DB 1532. Other data are intended also for the whole of Japan.

An external information gathering portion 154 to function as an updating means is connected to the database 153. External information gathered by this external information gathering portion 154 includes various traffic information such as traffic congestion information (the place, distance and degree of congestion), road-repairing information (the section and period of repairing), traffic accident information (the location and degree of an accident, the possibility of passing, an expected time to end the disposition of the accident, and the like) and the like, and each of these information is used in a route finding process by the system control portion 152. The external information gathering portion 154 functions as an updating means by updating the contents of the traveling road DB 1532 on the basis of gathered external information such as congestion information and the like.

As other data to be stored in the database 153, for example, data for guidance are stored. The guidance data include various guidance data such as map data of each intersection and street, landmark data showing main facilities, voice guidance data and the like.

The external information gathering portion 154 gathers information such as roads, intersections, new or changed traffic regulations (traveling road DB 1532), new facilities, degree of occupation of a parking lot and the like (destination DB 1531), and updates data stored in the database 153 at any time.

The external information gathering portion 154 gathers these information utilizing communication means such as a telephone circuit, a private circuit, a radio channel and the like.

Next, functions of the operation processing portion 101 of the navigation apparatus 100 and functions of the system control portion 152 of the center apparatus 150 in a route guidance system composed in such a way are described with reference to FIG. 2.

Figure 2:
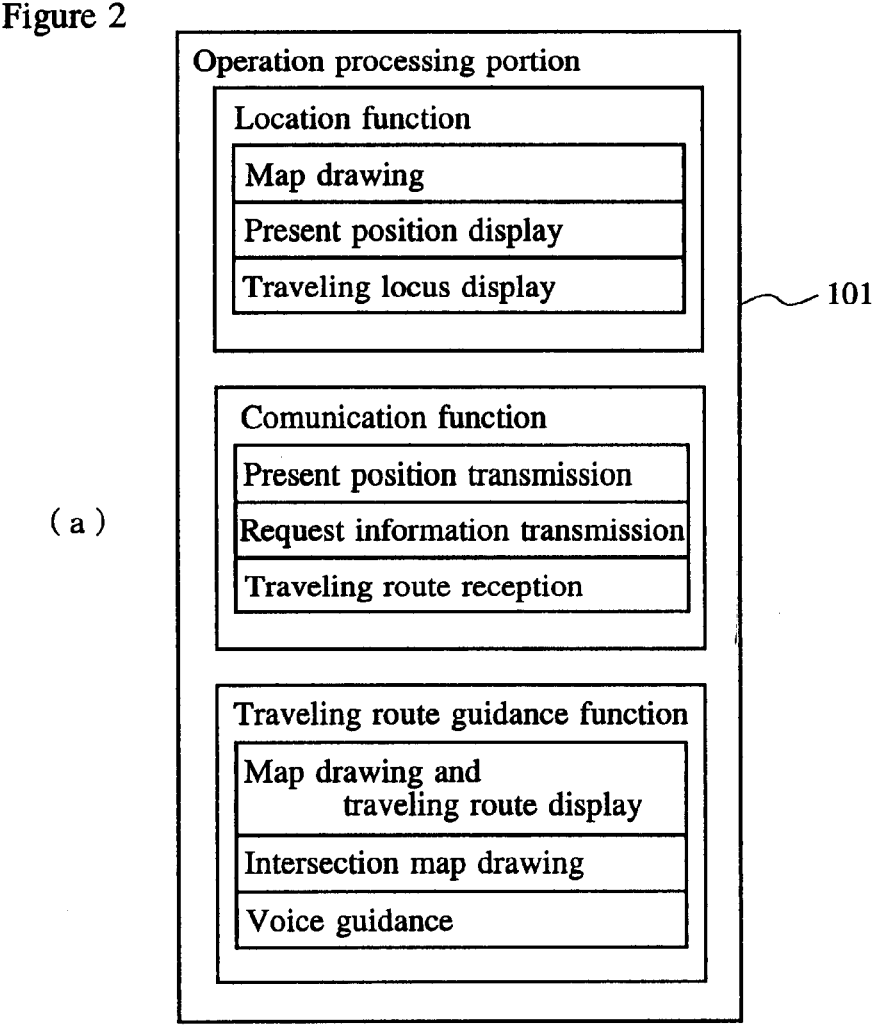
FIG. 2 is an explanatory diagram showing functions shared between a navigation apparatus and a center apparatus of the route guidance system in the same embodiment.
Figure 2:
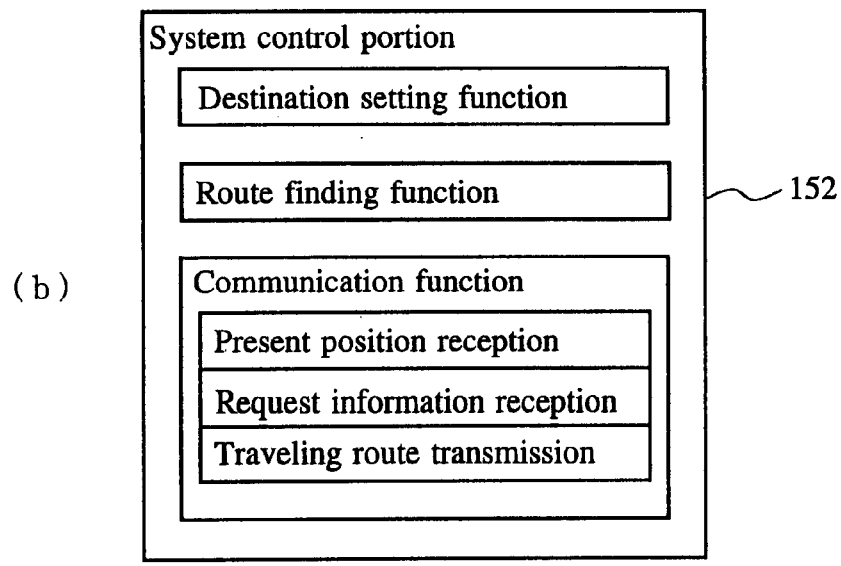

As shown in FIG. 2(*a*), functions which the operation processing portion 101 of the navigation apparatus 100 takes charge of include a location function, a communication function and a traveling route guidance function. Among them, the location function can be performed utterly by the navigation apparatus 100 alone. The traveling route guidance function can be performed by the navigation apparatus 100 alone, but this is under the condition that a traveling route is received by communication with the center apparatus 150.

The operation processing portion 101 draws a background map, displays the present position and displays a traveling locus on the display device 106 as its location function, transmits the present position to, transmits request information for setting a destination to and receives a traveling route from the center apparatus 150 as its communication function, and draws a background map, displays a traveling route, draws an intersection map and performs a voice guidance as its traveling route guidance function.

And as shown in FIG. 2(*b*), functions which the system control portion 152 of the center apparatus 150 takes charge of include a destination setting function, a route finding function and a communication function. The system control portion 152 receives the present position, receives request information and transmits a traveling route as its communication function. And as its route finding function, it finds a traveling route to a destination, divides the found traveling route and generates a traveling route to be transmitted to the navigation apparatus 100. Searching and finding a route to a destination are performed in a whole traveling route transmission mode and in a divided route transmission mode, and division of a traveling route and generation of a traveling route to be transmitted are performed in a divided route transmission mode.

Next, operations of the functions shared in such a way in the route guidance system are described.

(i) Location process

The location process is a process most frequently used usually in such a case that a driver travels in a known area or on a known road.

Figure 3:
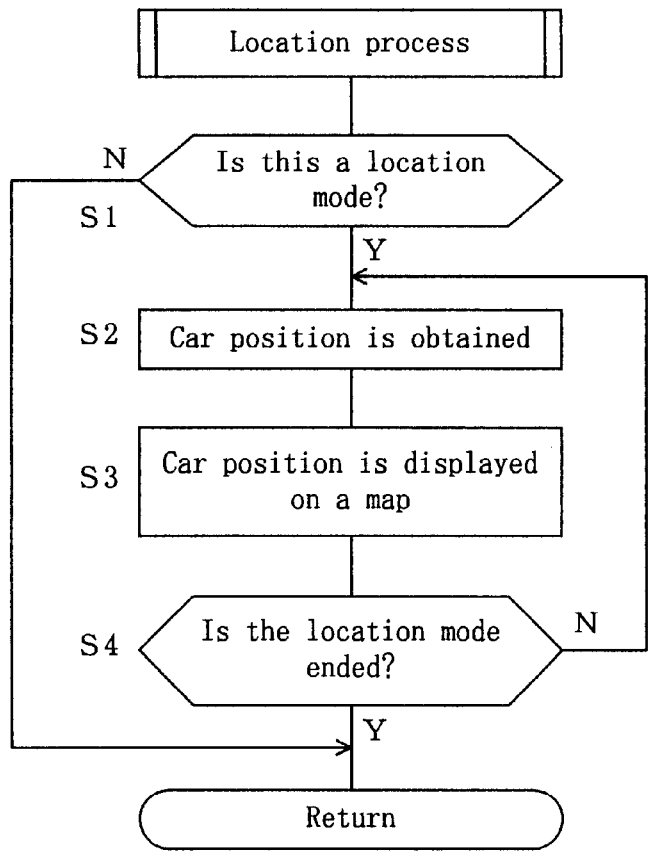
FIG. 3 is a flowchart showing operation of a location process.
Figure 4:
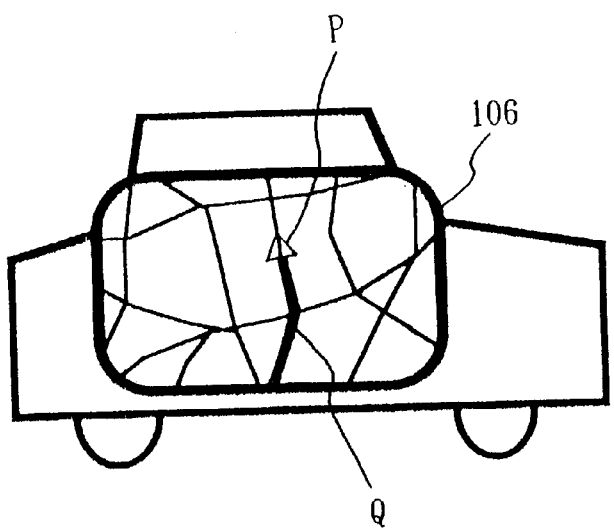
FIG. 4 is an explanatory diagram showing the content of a location process performed by a navigation apparatus on its lone in the same embodiment.

FIG. 3 is a flowchart showing operation of a location process, and FIG. 4 shows an image displayed on the display portion 106 as a result of performing the location function.

The operation processing portion 101 judges whether or not a location mode is set (step 1). In case of a location mode (Y in step 1), the operation processing portion 101 obtains successively the present position of a car detected by the present position detecting portion 104 in this location process (step 2).

And the operation processing portion 101 performs a location display for indicating the present position of the car on a map (step 3). That is, the operation processing portion 101 reads background map data containing the present position obtained from the display map DB 1031 and displays a map of the peripheral area around the present position on the display portion 106. Further, it displays the present position P (displayed by a triangular mark in the figure) of the car on the displayed background map. Furthermore, the operation processing portion 101 finds and displays a traveling locus Q from movement of the present position P. This traveling locus displays the road along which the car has traveled in color such as red or the like on the screen.

After this, the operation processing portion 101 judges whether or not the location mode ends (step 4). In case that a route guidance mode is selected, the operation processing portion 101 judges that the location mode ends when the power source of navigation is turned off (Y in step 4), and returns to the main routine. On the other hand, in case that the location mode does not end (N in step 4), the operation processing portion 101 returns to step 2 and continues the location process.

In such a way, in case of traveling in a known area, since a user often knows place names, facilities, main streets and the like, it is enough for the user to be capable of using only the location function being capable of confirming on a map where the car is traveling around at present, and thus it is possible to use the navigation apparatus 100 without hindrance. Since such a location function does not need to perform a destination setting process or a route finding process, the efficiency of utilizing the location function is improved. And since the location function can be used alone, the communication time and communication expenses for the location function become unnecessary.

(ii) Destination setting process and route finding process

The destination setting process and route finding process, which are performed in the center apparatus 150, are performed in such a case that a user desires a traveling route guidance to its destination as a case that the user at the car side travels in an unknown area or on an unknown road. The destination setting process and route finding process are performed regardless of the present position of a car or the position of a destination in case that a user at the car side desires a traveling route guidance, and these processes can be performed according to the user's desire even if the present position or the destination is within a zone in which a location function can be performed (within an area of a background map stored in the display map DB 1031).

And as a process to complement the destination setting process and route finding process in the center apparatus 150, a reception and transmission process of necessary data by communication functions of the navigation apparatus 100 and the center apparatus 150 is performed.

Figure 5:
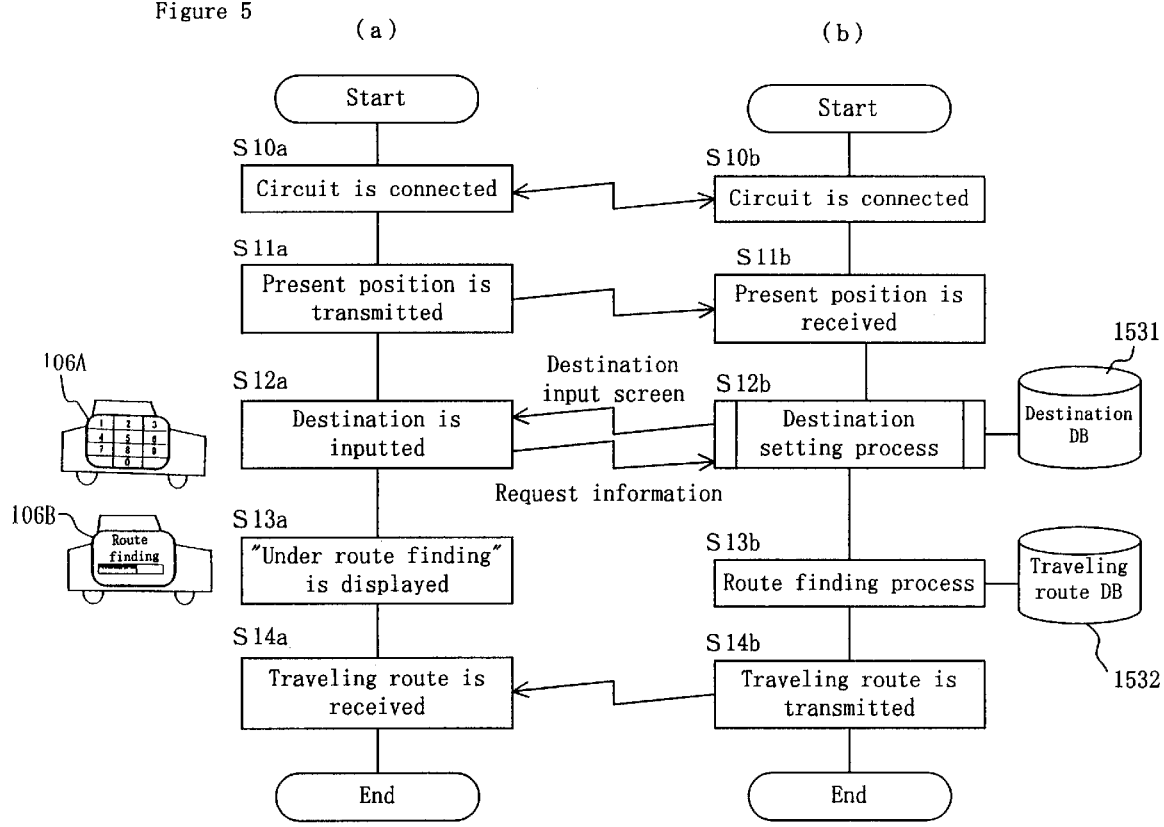
FIG. 5 is a flowchart showing operations of a navigation apparatus and a center apparatus in a destination setting process and a route finding process in the same embodiment.

FIG. 5 is a flowchart showing the flow of a destination setting process, a route finding process and a communication process to complement these processes.

A trigger for starting a process according to this flowchart is a traveling route guidance request performed by a car side user. That is, when a car side user inputs "Traveling route guidance" through the input portion 105 (including a touch panel attached to the display portion 106), the operation processing portion 101 of the navigation apparatus 100 automatically dials and performs a request for connection of a communication circuit to the center apparatus at the center apparatus side 150 through the car side communication portion 108, and connects a circuit between the car side communication portion 108 and the center side communication portion 151 (step 10a and step 10b).

The communication between the car side communication portion 108 and the center side communication portion 151 is performed by a packet communication system.

When the communication circuit with the center apparatus 150 is connected, the operation processing portion 101 transmits the present position (Latitude and Longitude) of the car detected by the present position detecting portion 104 through the car side communication portion 108 to the center apparatus 150 (step 11a). The transmission of the present position of the car may be performed after setting a destination or in the middle of setting a destination or directly before a route finding process is started.

The system control portion 152 receives the transmitted present position through the center side communication portion 151 and stores it into a specified area of the RAM (step 11b). And the system control portion 152 transmits a destination input screen necessary for setting a destination using the destination DB 1531 to the navigation apparatus 100 and receives request information, and thereby performs a destination setting process (step 12b). On the other hand, the operation processing portion 101 displays the destination input screen on the display portion 106, and transmits in order a state and a key selected by the user as request information for setting the destination (step 12a).

A display portion 106A displayed at the left side of the flowchart of FIG. 5 shows a state in which a telephone number input screen transmitted from the center apparatus 150 side is displayed due to the user's selection of destination setting by telephone number. When the user inputs a desired telephone number in the telephone number input screen, the inputted telephone number is transmitted to the center apparatus 150 as request information.

The center apparatus 150 may transmit destination input screens in order at plural times according to request information. For example, in case that a user selects a destination setting process on the basis of a genre, a destination setting screen for each hierarchical layer is transmitted over plural times.

When a destination is set by the navigation apparatus 100, the center apparatus 150 finds a traveling route to the set destination and transmits a traveling route to the navigation apparatus, and hereupon, there are a whole traveling route transmission mode for transmitting the whole traveling route found to the navigation apparatus 100, and a divided route transmission mode for dividing a traveling route to the destination and transmitting a divided traveling route of it. In the processing on and after steps 13a and 13b of FIG. 5, a whole traveling route transmission mode is described and a divided route transmission mode is described later.

The center apparatus 150 searches and finds a traveling route from the present position of the car to the set destination stored in the RAM by the system control portion 152 by means of the traveling route DB 1532 (step 13b).

While this route finding process is being performed, the operation processing portion 101 of the navigation apparatus 100 displays that a route is being searched and found in the center apparatus 150 (step 13a). A display portion 106B displayed at the left side of the flowchart of FIG. 5 shows a comment indicating a state of being searching and finding a route and a bar graph indicating the progress of route finding.

When finding a route to the destination ends, the system control portion 152 of the center apparatus 150 transmits the road data of a found traveling road (step 14b) and ends the process.

On the other hand, when the operation processing portion 101 of the navigation apparatus 100 receives the road data transmitted from the center apparatus 150, it stores the road data into the traveling road storage portion 1032 (step 14a) and ends the process.

In such a way, since the navigation apparatus 100 performs only such simple auxiliary processes as transmission of request information for a destination and reception of a traveling road, and performs no destination setting process nor route finding process, it can lighten the burden on the operation processing portion 101.

And since it performs no destination setting process nor route finding process, each car does not need to store in it a destination DB and a traveling road DB having a great amount of data being low in frequency of use, and therefore can make small the storage capacity of the storage portion 103.

And by keeping the destination DB 1531 and the traveling road DB 1532 in the center apparatus 150 instead of the navigation apparatus 100 of each of plural cars, it is possible to make small the capacity of storage as the whole route guidance system, and since a destination setting process and a route finding process are performed according to a route finding request from each of plural navigation apparatuses 100, it is possible to make high the efficiency of use of both these databases.

(iii) Route guidance process

The route guidance process guides a user on a traveling route to a destination received from the center apparatus 150, and is performed by the navigation apparatus 100 alone according to the road data of the received traveling road. The route guidance process is performed in the same way in any of the whole traveling road transmission mode and the divided route transmission mode. Both these modes are different from each other only in the range of a route to be transmitted, and in the range of a received traveling route the route guidance is performed in the same way.

FIG. 5 shows the procedure of guidance on a traveling route.

As shown in FIG. 5, the operation processing portion 101 of the navigation apparatus 100 acquires successively the present position of the car detected by the present position detecting portion 104, reads background map data containing the acquired present position from the display map DB 1531, and displays a map around the present position on the display portion 106a. And it displays the present position of the car on the displayed background map. Since the above process is the same as a map drawing process in the location function, the same program may be used in both the processes.

The operation processing portion 101 displays the traveling route R to be guided on, said traveling route being stored in the traveling road storage portion 1032, over the background map displayed on the display portion 106a. This traveling route R is displayed in a different color from the color of blue streets and the color of the traveling locus.

Figure 6:
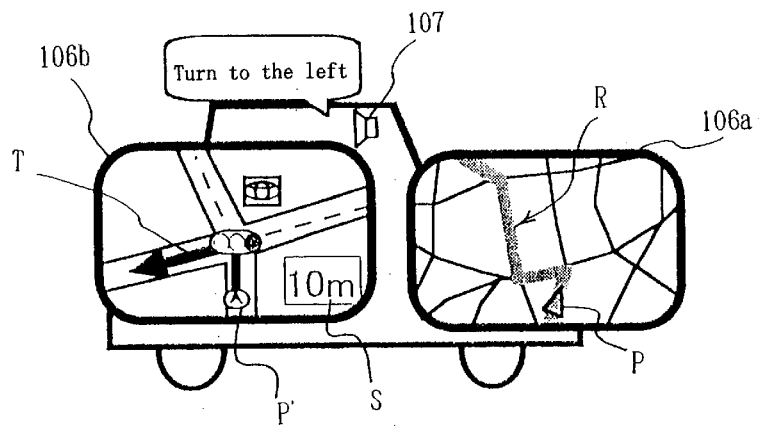
FIG. 6 is an explanatory diagram showing the content of a route guidance process performed by a navigation apparatus on its lone in the same embodiment.

Further, when the present position of the car reaches near an in tersection where the car needs to change the direction of progress in the traveling route, said intersection being stored in the traveling route storage portion 1032, the operation processing portion 101 draws and displays a magnified view of the said intersection using road data (intersection data, road width data, etc). stored in the traveling route storage portion 1032, as shown by 106b of FIG. 6. In this magnified view of the intersection, the present position P' of the car is displayed, the direction of progress to be changed is indicated by an arrow T, and the distance from the present position to the intersection where the direction of progress is to be changed is displayed in a distance indication field S at the bottom right.

And the operation processing portion 101 outputs a guidance speech such as "Turn to the left" and the like from a speaker of the voice output portion 107.

(iv) Divided route transmission mode process

Next, operations of the navigation apparatus 100 and the center apparatus 150 in the divided route transmission mode are described. First, as an outline of the operations, a typical series of operations according to this embodiment are described with reference to FIGS. 7 and 8

Figure 7:
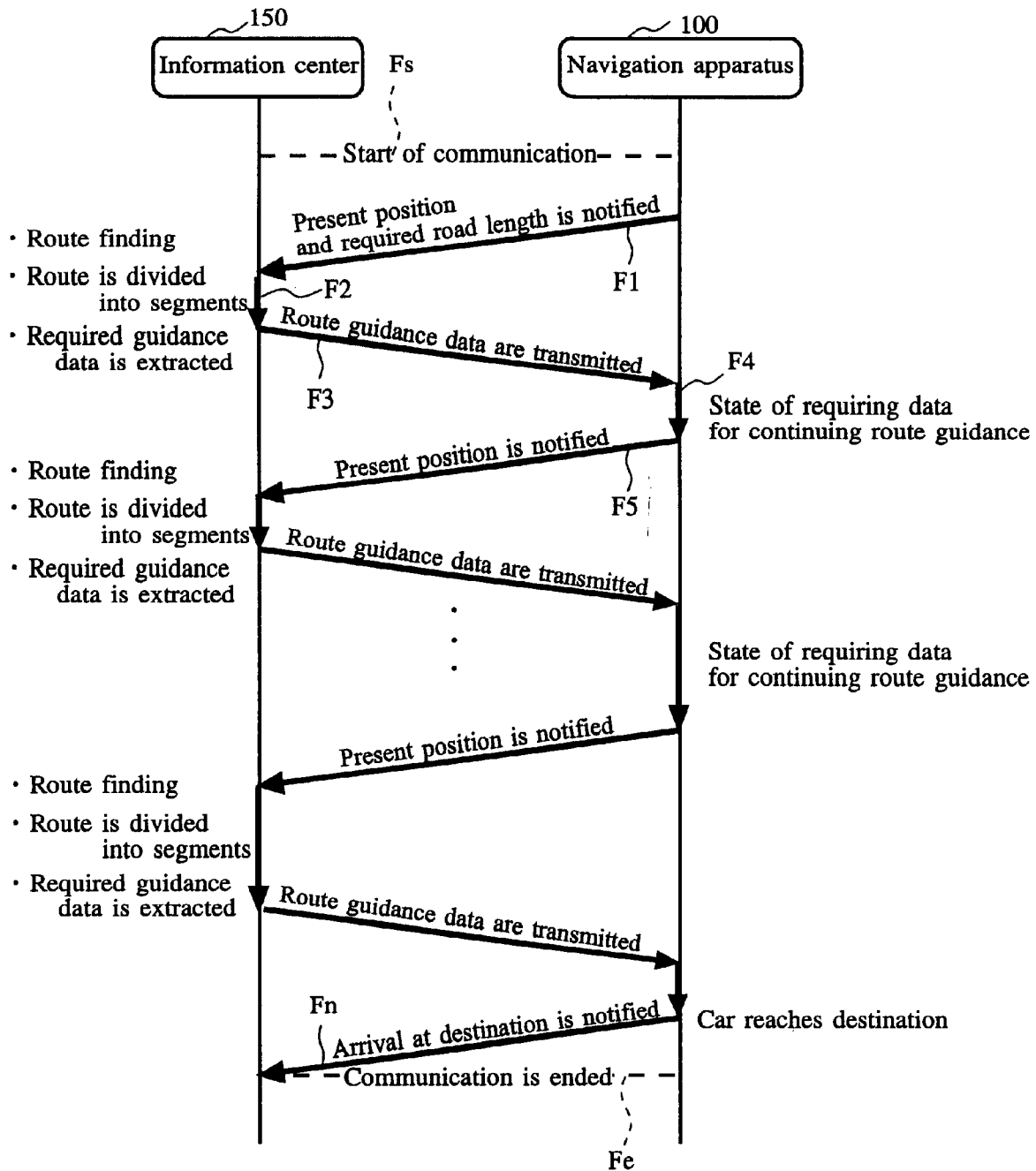
FIG. 7 is an explanatory diagram showing a typical example of data exchange between the center apparatus and the navigation apparatus.

FIG. 7 shows a typical example of data exchange between the center apparatus 150 and the navigation apparatus 100.

At Fs the communication in steps 10a and 10b (FIG. 5) is started (a calling request packet CR is transmitted in case of a packet communication system, and a calling operation (off-hook operation) is performed in case of a circuit switching system), and at Fe the communication ends (a disconnection confirming packet is received in case of a packet communication system, and a disconnecting operation (on-hook operation) is performed in case of a circuit switching system).

Now it is assumed that after the start of communication Fs each of step 11a (transmission of the present position), step 11b (reception of the present position), step 12a (input of a destination), and step 12b (destination setting process) shown in FIG. 5 have been finished. In case of the divided route transmission mode, the system control portion 152 of the center apparatus 150 keeps the destination set in step 12b stored in a specific area of the RAM and uses it in a route finding process performed before each transmission of a divided route.

As shown by arrow F1, first the navigation apparatus 100 notifies the center apparatus 150 of the present position, a required road length and a route guidance request (not illustrated). A required road length is set by a user of the navigation apparatus 100 and is transmitted in case that it is stored in the storage portion 103.

Although described later with reference to FIG. 9, as shown by arrow F2, the center apparatus 150 searches and finds a route, divides the route into segments and extracts guidance data for a requested portion. And as shown by arrow F3, it transmits the obtained route guidance data to the navigation apparatus 100.

The above operation of the center apparatus 150 is described with reference to FIG. 8.

Figure 8:
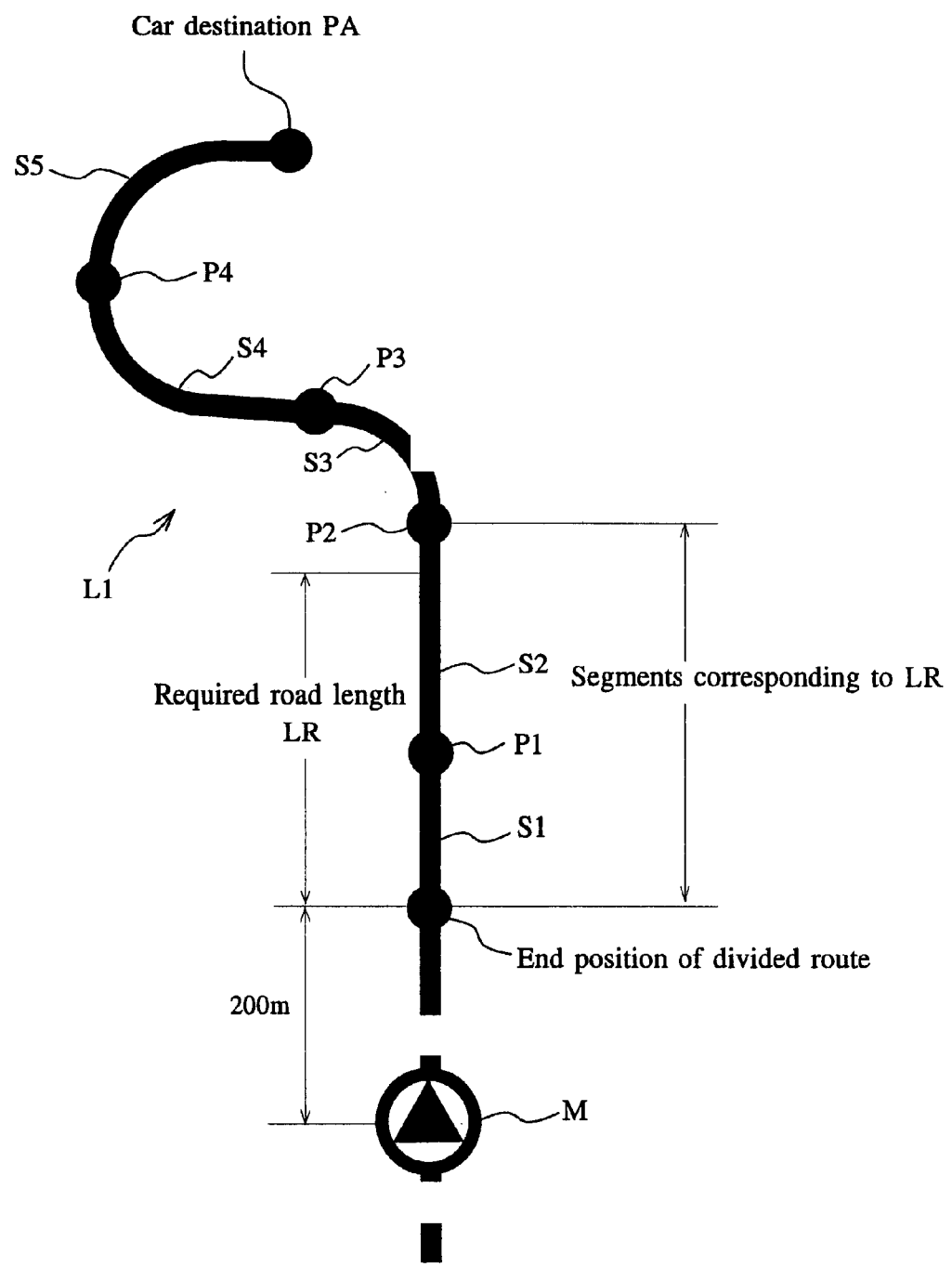
FIG. 8 is an explanatory diagram for conceptually explaining the division of a traveling route performed by the center apparatus.

As shown in FIG. 8, L1 shown by a thick solid line is the whole traveling route newly found from the end position PD of the divided route already transmitted to the car destination PA. M is a mark indicating a car position displayed correspondingly to the present position of the car.

This found route L1 is divided into five segments S1 to S5 in case of taking a specific distance (2 km for example) as a unit, and the dividing points of the segments are P1 to P4. Assuming that a required road length is LR, since segments S1 and S2 make "Transmitted road length >Required road length", route data and guidance data of segments S1 and S2 are transmitted to the navigation apparatus 100.

On the other hand, although described later with reference to FIG. 11, as shown by arrow F4 in FIG. 7, the navigation apparatus 100 performs a route guidance on said traveling route on the basis of the divided route guidance data received. Route guidance data which have become unnecessary are properly discarded. Hereupon, in case that continued data for the route guidance become necessary, as shown by arrow F5, the operation processing portion 101 notifies again the center apparatus 150 of the present position and a route guidance request. Since the required road length is stored in the center apparatus 150 by the first transmission, it is not transmitted on and after the second transmission, but without storing the required road length in the center apparatus 150, the required road length may be transmitted each time the present position and a guidance request are transmitted.

After this, the same operations are repeated until the car reaches the destination, and when the car reaches the destination, as shown by arrow Fn, the navigation apparatus 100 notifies the center apparatus 150 that the car has reached the destination, and the communication between the navigation apparatus 100 and the center apparatus 150 is ended.

Next, a route finding and guidance data transmission process at the center apparatus 150 side for dividing a traveling route found to the destination of the car into specific units and transmitting a divided route of it (FIG. 9), and a request and route guidance process of the navigation apparatus 100 side for performing a route guidance to the cart destination while requesting in order the transmission of the divided routes (FIG. 11) are described.

(a) Route finding and guidance data transmission process

Figure 9:
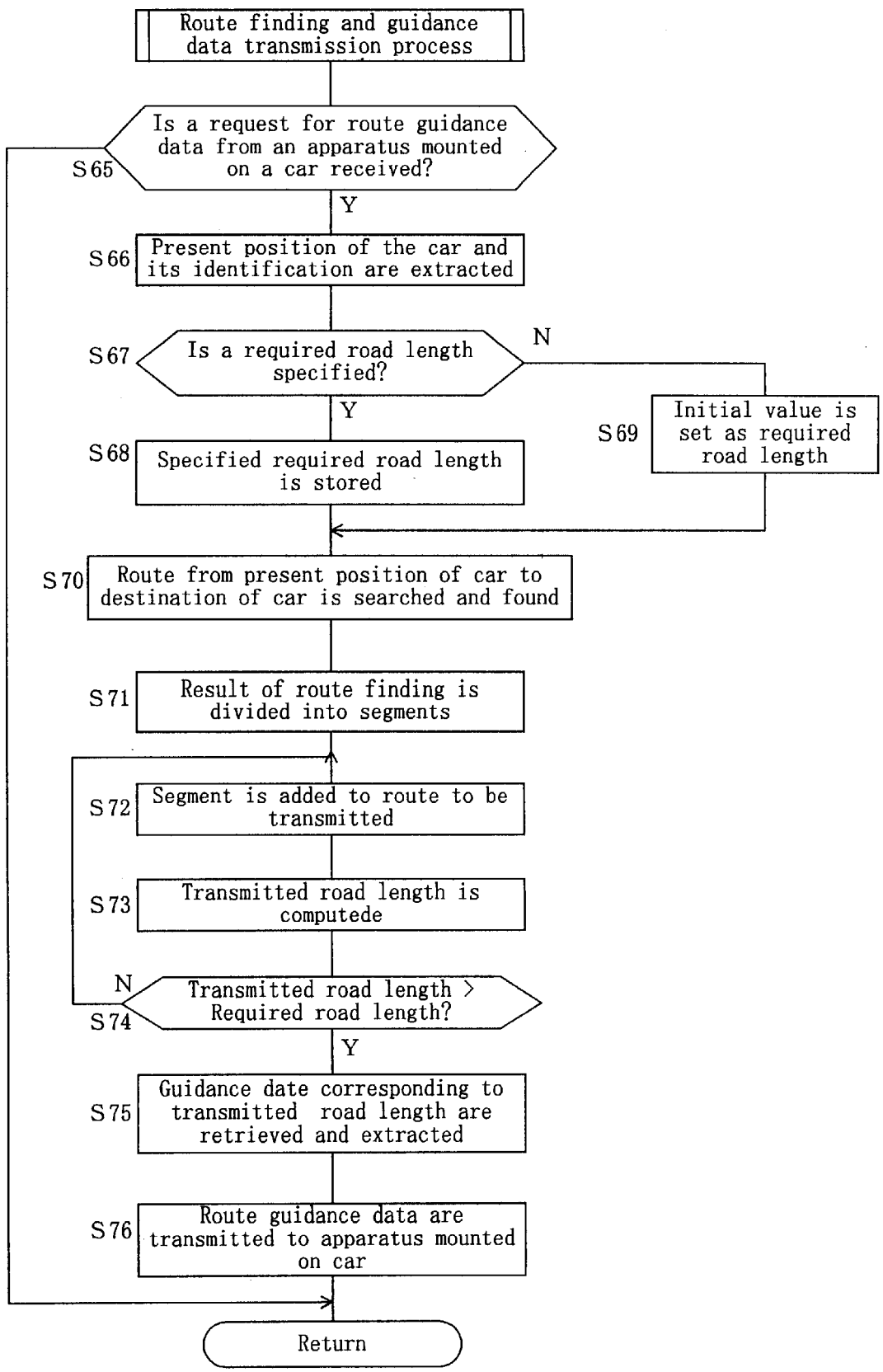
FIG. 9 is a flowchart showing operation of a route finding and guidance data transmission process at the center apparatus side for dividing a traveling route found to the destination of a car into specific units and transmitting a divided route.

As shown in FIG. 9, the system control portion 152 of the center apparatus 150 monitors whether or not the center apparatus 150 has received a route guidance data request from a navigation apparatus 100 (step 65), and in case that it has received (Y in step 65), extracts the present position of the car contained in the received information (step 66).

Next, in case that a required road length is specified in the received information (Y in step 67), the system control portion 152 stores the specified required road length into a given area of the RAM (step 68), and when not specified (N in step 67), reads and stores into the RAM the initial value prepared in advance as a required road length from other data, not illustrated, of the database 153 (step 69).

Next, the system control portion 152 searches and finds a route from the present position of the car to the destination (step 70). The route finding process is performed referring to data for route finding in the traveling road DB 1532, namely, intersection data, road data and node data. Such a route finding process is publicly known and is performed by such a method as disclosed, for example, in Japanese Patent Laid-Open Publication No.Hei 1-173,297 and Japanese Patent Laid-Open Publication No.Hei 1-173,298, and sets a recommended route under such a condition that a route having the shortest distance in total is the optimum route In this embodiment, each time a request from the navigation apparatus 100 is received (Y in step 65), a route from the present position of the car to the destination is searched and found. The center apparatus 150 acquires road information and traffic information such as the state and distance of traffic congestion, no possibility of passing due to occurrence of an accident, the section of road repairing and the like from the outside by means of the external information gathering portion 70, and updates the database 153 to the latest information. Therefore, a recommended route and its guidance data always based on the latest data for avoiding a traffic congestion and the like are provided to the navigation apparatus 100 by finding a route for each request from the car side.

Next, the system control portion 152 executes a segment processing program to divide a traveling route found to the destination into segments each being a unit of navigation (step 71). As a unit of division, a fixed data size (one segment of 1024 bytes for example), a fixed road length (1 km, 2 km and the like for example) and the like are conceivable. The whole route found is divided into divided route 1, divided route 2 and so forth as shown in FIG. 10(A) for example. Each divided route is one segment. Each divided route data includes a data head, intersection information, road information, node information, mark information and the like.

To divide data into segments in such a way brings an effect that (i) even if communication between the center apparatus 150 and the navigation apparatus 100 is interrupted, a route guidance can be continued as it is with respect to a segment which already finished to be transmitted at the time of interruption, and (ii) it is enough to retransmit a segment which was under transmission at the time of interruption. In other words, a segment is a unit of information capable of being decoded by the car side. For example, if the car side cannot decode route guidance data of 10 km transmitted to the car side as one file in whole, a route guidance cannot be performed on said whole route of 10 km. However, by dividing the whole route into each segment of 2 km to form it into each file, it is possible to perform a route guidance by decoding a file for each segment.

Next, the system control portion 152 adds in order one segment being closest to the position of the car within the found route (step 72) and computes the length of a road to be transmitted (step 73). That is the system control portion 152 repeats an operation of "Transmitted road length (Total road length of segments)=Transmitted road length before adding a segment+Road length of added segment" to add segments one after another.

And a segment is added until the total transmitted road length obtained by adding the length of a road contained in each segment becomes larger than the required road length stored in user's data 50 having the relevant identification (N in step 74).

As a result, when "Transmitted road length>Required road length (or Transmitted road length>=Required road length" is obtained (Y instep 74), the system control portion 152 executes a guidance data extracting program to retrieve and extract guidance data (map data of each intersection and road, landmark data indicating main facilities, voice guidance data and the like) within a range corresponding to the transmitted road length with reference to guidance data stored in the database 153 as the other data and store them into an extracted guidance data storing area of the RAM (step 75).

The route data and guidance data obtained in such a manner are transmitted through the communication control portion 12 to the navigation apparatus 100 which has performed the request (step 76). At this time, a segmented route and guidance data are transmitted to the car side in increasing order of distance from the present position of the car. (b) Request and route guidance process Next, a request and route guidance process performed by the navigation apparatus 100 correspondingly to the above-described route finding and guidance data transmission process performed by the center apparatus 150 is described with reference to a flowchart of FIG. 11.

Figure 11:
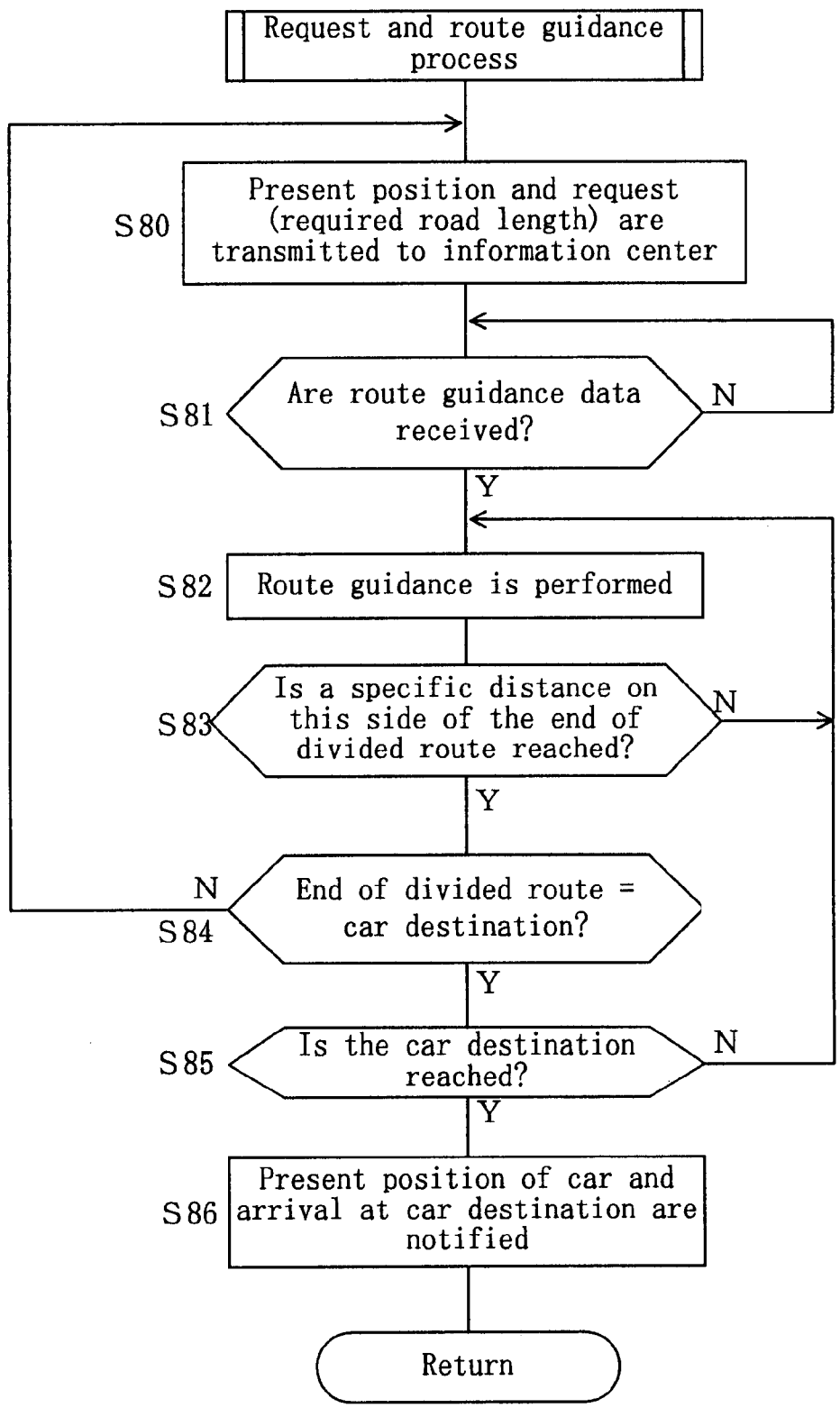
FIG. 11 is a flowchart showing operation of a request and route guidance process at the navigation apparatus side for guiding a user on a route to the car destination while requesting in order the transmission of divided routes.

As shown in FIG. 11, the operation processing portion 101 of the navigation apparatus 100 transmits the present position of the car, a request (route guidance data request) and a required road length to the center apparatus 150 (step 80). Here, on the assumption that a required road length is set by a user, the required road length is transmitted only at the first time.

And the operation processing portion 101 monitors whether or not it has received route guidance data divided correspondingly to the required road length (divided road data) from the center apparatus 150 (step 81), and when it has received (Y in step 81), it stores the route guidance data into the traveling route storage portion 1032 of the storage portion 103, and performs a route guidance process by means of a route guidance program described in said subsection (iii) (step 82).

For route guidance, the operation processing portion 101, for example, displays a map and a landmark of the route on the display portion 106, and makes the voice output portion 107 output a speech guidance such as "Turn to the right/left at the intersection about 200 m ahead" a specific distance on this side of an intersection where the car is to change the direction of progress while referring to the present position of the car in the position detecting portion 104.

In this embodiment, route guidance data received from the center apparatus 150 are not data of the whole traveling route to the destination, but are data of a divided route extracted from a traveling route newly found for each request for a divided route. And in a route finding process newly performed in response to a request, the latest traffic information and road information gathered by the external information gathering portion 70 are always used. Therefore, due to the change in the state of a road where the car is traveling (traffic congestion, occurrence of an accident and the like), a route different from a traveling route found at the time of start may be extracted. In such a way, even when the state of a road is changed when traveling, it is possible to always receive the optimum route at the present point of time and perform a route guidance by receiving divided routes. And it is possible also to flexibly cope with change of the destination.

Further, since the navigation apparatus 100 can receive only a divided route needed by it of a route length (transmitted road length) corresponding to a required road length from the center apparatus 100, it is possible to receive data according to the memory capacity of the navigation apparatus 100.

And since the amount of data to be received is made smaller and reception of a divided route is finished in a short time thanks to reception of the divided route corresponding to a required road length, it is possible to make earlier the start of driving a car and the start of a route guidance in comparison with a case of receiving the whole traveling route.

And since a route finding process from the present position of a car to its destination is performed for each request, even if the car deviates from its route, it is possible to obtain route guidance data to the destination by performing a request at the present position on the deviated road, and thereby a user can drive without anxiety.

During a route guidance, the operation processing portion 101 acquires the present position of the car from the position detecting portion 104 at intervals of a specific time, monitors whether or not the car has reached a specific distance (200 m for example) on this side of the end of a divided route stored in the traveling route storage portion 1032 (step 83), and if not yet reached (N in step 83), it returns to step 82 and continues the route guidance.

And when the car reaches a specific distance on this side of the end of the divided route (Y in step 83), the operation processing portion 101 judges whether or not the end of the divided route coincides with the destination (step 84). If it does not coincide with the destination (N in step 84), the operation processing portion 101 returns to step 80 and transmits again the present position of the car and a request (route guidance data request) to the center apparatus 150, and receives the next divided route and continues the route guidance.

In case that the end of the divided route coincides with the destination (Y in step 84), the operation processing portion 101 judges whether or not the car has reached the destination (step 85), and if the car has not reached the destination (N in step 85), it returns to step 82 and continues the route guidance.

On the other hand, in case that the car has reached the destination (Y in step 85), the operation processing portion 101 notifies the center apparatus 150 of the present position and a fact that the car has reached the destination (step 86), and returns to the main routine by the control program 154.

As for judging whether or not the car has reached the destination, it is judged that the car has reached the destination also in case that the car reaches within a traveling distance of 500 m to the destination and a position (near the destination) after the car has passed the last point of route guidance by voice, as well as in case that the car has reached actually the destination.

In such a way, by using a traveling route received from the center apparatus 150, the navigation apparatus 100 can perform by itself a traveling route guidance even to a strange destination without performing a destination setting process and a route finding process, and without having a destination DB and traveling road DB stored in it.

A route guidance process in this embodiment uses only road data of a traveling route found by the center apparatus 150, and the navigation apparatus side does not perform a route finding process.

Although the preferred embodiments of the present invention have been described above, the present invention is not limited to such embodiments, but can adopt other embodiments in the scope of the invention according to each claim and can modify such embodiments.

For example, although a navigation apparatus mounted on a car perform no destination setting process in the embodiments described above, some limited destination data out of destination data stored in the destination DB 1531 of the center apparatus 150 may be stored in the storage portion 103 of the navigation apparatus 100. The destination data in this case are basic destination setting data functionally limited to data for setting destinations by genres and the data limited to only destination data existing in an area of map data stored in the display map DB 1531 are stored, and thereby the amount of data to be stored can be reduced.

The basic destination data to be stored in the storage portion 103 are stored in a rewritable storage medium such as a hard disk, a flash memory or the like for example. And it is acceptable that the contents of basic destination setting data functionally limited can be changed through communication with the center apparatus 150. For example, a user can request the center apparatus 150 to change the contents of basic destination setting data from basic destination setting data capable of being set by genre to basic destination setting data in which a destination can be set by telephone number.

A destination setting process of the navigation apparatus 100 using such basic destination setting data is performed by a limited function, for example, selection from genres, telephone numbers, addresses and the like.

A destination set by the navigation apparatus 100 is used only by a location function. That is, the set destination is placed on a background map of the display portion 106 shown in FIG. 3. In this case a map scaled so that both of the destination and the present position canbe displayed on the display portion 106 is selected, and in case that a user selects display of a detailed map around the present position P which the destination cannot be displayed together with, an arrow or the like indicating the direction of the destination may be displayed on the screen.

In such a way, since basic destination setting data stored and used in this variation example are limited in functionality and area, they are satisfied with a small amount of data, and since they enable the direction or position of a destination to be displayed, they can be effectively utilized in a location function.

And the embodiment described above stores display map data of the whole area of a wide specific area (the whole of Japan in the described embodiment) to be used by the location function in the display map DB 1531 of the navigation apparatus 100, but the display map data to be stored in the display map DB 1531 may be intended for a given area being included in a specific area and smaller than the specific area, namely, for a part of the specific area instead of the whole of the specific area.

And by taking as such a given area an area around one of a user's house and place of employment or an area including both of them, it is possible to improve the efficiency of use of the database. And by storing in the database the display map data limited to a given area where a user most frequently travels, it is possible to make small the storage capacity of the display map DB 1031 of the navigation apparatus 100.

As such a given area, a smaller area than a specific area is selected, and for example in case that a specific area is the whole of Japan, one of various limited areas such as a range of 200 km square, range of n km square (n is an optional value such as 100, 50, 20 and others), range obtained by partitioning the whole of Japan into the respective districts of Hokkaido, Tohoku, Kanto, Chubu, Chugoku, Shikoku and Kyushu, range including specified To, Fu or Prefecture and To, Fu's or Prefectures adjacent to them, range of one of To, Do, Fu's and Prefectures, range including a specified city, ward, town or village and cities, wards, to wns or villages adjacent to them, range of one of cities, wards, towns and villages, or range of a specific state or district is selected.

In such a way, in case of storing only display map data of a given area in the navigation apparatus 100, since display map data are not stored in the database 153 of the center apparatus 150, in case that a user travels outside a given area stored in the display map DB 1031 of the navigation apparatus 100 (hereinafter, referred to as a usually used area) the user can use no location function at all and can use only a voice guidance as a route guidance function. Thereupon, display map data of a wide specific area (for example, the whole of Japan, whole of United States of America, whole of Germany, whole of a specific country, whole of countries of EC, a specific area such as specific State, specific To, Do, Fu or Prefecture, or the like) may be stored in a specific area display map DB of the database 153 of the center apparatus 150, and display map data of a necessary area may be transmitted according to a request from the navigation apparatus 100. In this case the navigation apparatus 100 stores temporarily the received display map data into a hard disk, a flash memory or the like and erases the data when the car returns in in to a usually used area.

Display map data in a route guidance system are transmitted and received in each of the following cases. That is to say, in case that a user of a navigation apparatus requests the center apparatus 150 to transmit display map data of a necessary area by specifying it in advance, display map data of the requested area are transmitted and received. And in case that a destination existing outside a usually used area is setin the destination setting process described with reference to FIG. 4 display map data including a traveling route found by a route finding process after that and an area outside the usually used area are automatically transmitted and received. In this case the usually used area is also transmitted from the navigation apparatus 100 to the center apparatus 150 when the present position is transmitted in step 11$a$ of FIG. 5.

And in case that the present position reaches 1 km on this side of the boundary of the usually used area, the operation processing portion 101 of the navigation apparatus 100 may request the center apparatus 150 to transmit display map data of certain areas continued to this area In such a way, even in case of traveling outside a usually used area, the navigation apparatus 100 can provide a location function intended for the whole country by receiving and temporarily storing display map data from the center apparatus 150.

The center apparatus 150 in the embodiment described above searches and finds newly the traveling route to a destination for a request for a divided route from the navigation apparatus 100 and transmits the divided traveling route data, but it may transmit regardless of a request from the navigation apparatus 100. That is, the center apparatus 150 receives the present position of a car at regular intervals (for example, at intervals of a specific time or at intervals of a specific traveling distance). And the center apparatus 150 judges whether or not the present position of the car reaches a specific distance (for example, 200 m) on this side of the end of the divided route already transmitted, and at the point of time of determining that it has reached, the center apparatus 150 newly searches and finds a traveling route to the destination and transmits divided route data to the navigation apparatus 100 in the same way as described above. And usually, the center apparatus 150 may newly find a route for each request from the navigation apparatus 100 and transmit divided route data, and in case that such a state change that the divided traveling route to be transmitted becomes an inappropriate route occurs, the center apparatus 150 may perform a traveling route finding process and transmission of divided route data without depending on a request from the navigation apparatus 100. That is, since the center apparatus 150 always gathers the latest traffic information such as traffic accident information, traffic congestion information and the like by means of the external information gathering portion 154, it can detect the cause of a traveling failure such as a traffic accident which has occurred on a divided route already transmitted. Thereupon, the center apparatus 150 monitors whether or not the cause of a traveling failure such as a traffic accident or the like occurs between the present potion of the car and the end of the divided route already transmitted, and when it occurs, the center apparatus 150 immediately finds a new traveling route to the destination. Since this traveling route finding process is performed using the traveling road DB 1532 in which traffic information such as traffic accident information or the like is reflected, a new traveling route is found in consideration of a traffic accident and a traffic congestion. The center apparatus 150 transmits divided route data based on this new traveling route to the navigation apparatus 100. When the navigation apparatus 100 receives the divided route data transmitted from the center apparatus 150 before performing a request for the next divided route data, it judges that a failure such as a traffic accident or the like occurs on the divided route already received, stores the divided route data newly received into the traveling route storage portion 1032, and perform guidance on this traveling route. (Utilizability in Industry).

As described above, according to a route guidance system of the present invention, since data to be stored and functions are properly shared between a navigation apparatus mounted on a car and a center apparatus, it is possible to efficiently provide a location function and a route guidance function meeting the purpose and state of a user's drive.

What is claimed is:

1. A route guidance system composed of a navigation apparatus mounted on a car and a center apparatus communicating with a plurality of navigation apparatuses, wherein;

said navigation apparatus comprising;
   a storage means for having background map data stored in it,
   a present position detecting means for detecting the present position of the car,
   a display device,
   a location means for reading a background map around the present position detected by said present position detecting means from said background map data storage means and displaying the background map on said display device, and displaying said present position on the background map,
   a car side communication means for transmitting said detected present position and request information necessary for setting a destination in the center apparatus, and receiving a traveling route found to the destination from the center apparatus, and
   a route guidance means for guiding a user on the traveling route received by this communication means;
   said center apparatus comprising;
   a background map database,
   a destination database storing in it detailed information related to a destination for setting the destination,
   a traveling road database for finding a route to a destination,
   a destination setting means for setting a destination meeting request information transmitted from said navigation apparatus by means of said destination database,
   a route finding means for searching and finding a traveling route from the present position of a car transmitted from said navigation apparatus to a destination set by said destination setting means by means of said traveling road database, and
   a center side communication means for receiving said request information and said present position through communication with said navigation apparatus, and transmitting a traveling route found by said route finding means.

2. A route guidance system composed of a navigation apparatus mounted on a car and a center apparatus communicating with a plurality of navigation apparatuses, said center apparatus dividing, and transmitting a traveling route found to a destination to said navigation apparatus, wherein;

said navigation apparatus comprising;
   a background map data storage means for having background map data stored in it,
   a present position detecting means for detecting the present position of the car,
   a display device,
   a location means for reading a background map around the present position detected by said present position detecting means from said background map data storage means and displaying the background map on said display device, and displaying said present position on the background map,
   a car side communication means for transmitting request information necessary for setting a destination in the center apparatus, and receiving a traveling route from the center apparatus, and
   a route guidance means for guiding a user on the traveling route received by this communication means;
   said center apparatus comprising;
   a destination database storing in it detailed information related to a destination for setting the destination,
   a traveling road database for finding a route to a destination
   an updating means for updating said traveling road database,
   a destination setting means for setting a destination meeting request information transmitted from said navigation apparatus by means of said destination database,
   a route finding means for searching and finding a traveling route to a destination set by said destination setting means by means of said traveling road database before each transmission of a divided traveling route to said navigation apparatus,
   a route dividing means for dividing a traveling route found by said route finding means and generating a traveling route to be transmitted, and
   a center side communication means for receiving said request information through communication with said navigation apparatus, and transmitting a traveling route generated by said route dividing means.

3. A route guidance system according to claim 2, wherein;
   said navigation apparatus transmits a request for transmission of a divided route to said center apparatus,
   said route finding means of said center apparatus finds a traveling route to a destination each time it receives a request for transmission of a divided route or in case that the cause of a traveling failure such as a traffic accident occurs on the traveling route lastly transmitted.

4. A route guidance system according to claim 1, wherein;
   said center side communication means is provided with a background map database storing in it background map data about a wide specific area, reads background map data required by said navigation apparatus from said background map database and transmits the background map data to said navigation apparatus which has performed the request for transmission, and
   said navigation apparatus stores background map data of a given area smaller than said specific area into a background map data storage means, and comprises a request means for requesting said center apparatus to transmit background map data of an area outside a given area stored in said background map data storage means through said car side communication means, and a second storage means for temporarily storing in it the background map data required to be transmitted by this request means.

5. A route guidance system according to claim 4, wherein;
   said navigation apparatus is provided with basic destination setting data consisting of typical destinations and a simple destination setting means for simply setting a destination according to said basic destination setting data, and said location means displays a destination set by said simple destination setting means together with a background map and the present position displayed on said display device.

6. A route guidance system according to claim 1, wherein;

said navigation apparatus is provided with basic destination setting data consisting of typical destinations and a simple destination setting means for simply setting a destination according to said basic destination setting data, and said location means displays a destination set by said simple destination setting means together with a background map and the present position displayed on said display device.

7. A route guidance system according to claim 2, wherein;

said center side communication means is provided with a background map database storing in it background map data about a wide specific area, reads background map data required by said navigation apparatus from said background map database and transmits the background map data to said navigation apparatus which has performed the request for transmission, and said navigation apparatus stores background map data of a given area smaller than said specific area into a background map data storage means, and comprises a request means for requesting said center apparatus to transmit background map data of an area outside a given area stored in said background map data storage means through said car side communication means, and a second storage means for temporarily storing in it the background map data required to be transmitted by this request means.

8. A route guidance system according to claim 3, wherein;

said center side communication means is provided with a background map database storing in it background map data about a wide specific area, reads background map data required by said navigation apparatus from said background map database and transmits the background map data to said navigation apparatus which has performed the request for transmission, and said navigation apparatus stores background map data of a given area smaller than said specific area into a background map data storage means, and comprises a request means for requesting said center apparatus to transmit background map data of an area outside a given area stored in said background map data storage means through said car side communication means, and a second storage means for temporarily storing in it the background map data required to be transmitted by this request means.

9. A route guidance system according to claim 2, wherein;

said navigation apparatus is provided with basic destination setting data consisting of typical destinations and a simple destination setting means for simply setting a destination according to said basic destination setting data, and said location means displays a destination set by said simple destination setting means together with a background map and the present position displayed on said display device.

10. A route guidance system according to claim 3, wherein;

said navigation apparatus is provided with basic destination setting data consisting of typical destinations and a simple destination setting means for simply setting a destination according to said basic destination setting data, and said location means displays a destination set by said simple destination setting means together with a background map and the present position displayed on said display device.

* * * * *